United States Patent
Dai et al.

(10) Patent No.: US 11,043,152 B2
(45) Date of Patent: Jun. 22, 2021

(54) METHOD AND APPARATUS FOR FILLING HOLES IN NAKED-EYE 3D MULTI-VIEWPOINT IMAGE, AND ELECTRONIC DEVICE FOR PERFORMING THE METHOD

(71) Applicant: BOE TECHNOLOGY GROUP CO., LTD., Beijing (CN)

(72) Inventors: Bin Dai, Beijing (CN); Xiaomang Zhang, Beijing (CN); Yanhui Xi, Beijing (CN); Yan Sun, Beijing (CN); Yankai Gao, Beijing (CN); Yuxin Bi, Beijing (CN); Lingyun Shi, Beijing (CN)

(73) Assignee: BOE TECHNOLOGY GROUP CO., LTD., Beijing (CN)

( * ) Notice: Subject to any disclaimer, the term of this patent is extended or adjusted under 35 U.S.C. 154(b) by 70 days.

(21) Appl. No.: 16/438,792

(22) Filed: Jun. 12, 2019

(65) Prior Publication Data

US 2020/0013322 A1 Jan. 9, 2020

(30) Foreign Application Priority Data

Jul. 3, 2018 (CN) .......................... 201810717779.7

(51) Int. Cl.
*G09G 3/00* (2006.01)
*G09G 3/3291* (2016.01)
(Continued)

(52) U.S. Cl.
CPC ........... *G09G 3/007* (2013.01); *G09G 3/3233* (2013.01); *G09G 3/3291* (2013.01);
(Continued)

(58) Field of Classification Search
CPC .. G09G 3/3233; G09G 3/3607; G09G 3/3291; G09G 3/007; G09G 2300/0819;
(Continued)

(56) References Cited

U.S. PATENT DOCUMENTS 9,135,744 B2 * 9/2015 Ho .......................... G06T 15/40

FOREIGN PATENT DOCUMENTS

| CN | 101556700 A | 10/2009 |
| CN | 102034265 A | 4/2011 |

(Continued)

OTHER PUBLICATIONS

First Office Action dated May 22, 2019 corresponding to Chinese application No. 201810717779.7.

*Primary Examiner* — Brenda C Bernardi
(74) *Attorney, Agent, or Firm* — Nath, Goldberg & Meyer; Joshua B. Goldberg

(57) ABSTRACT

A method for filling holes in a naked-eye 3D multi-viewpoint image is provided, comprising: sequentially performing a step of mapping, determining and marking row by row, comprising mapping two first pixels adjacent to each other in a row direction among a plurality of first pixels in a reference camera image to two second pixels in a virtual camera image, determining whether there is a hole between the two second pixels, and if so, marking the hole; and sequentially performing a step of scanning, assessing and filling row by row, comprising scanning two second pixels adjacent to each other in a row direction, assessing whether there is a marked hole between the two adjacent second pixels, and filling the marked hole according to at least one non-zero second pixel which is adjacent to the marked hole.

10 Claims, 4 Drawing Sheets

(51) Int. Cl.
*G09G 3/36* (2006.01)
*G09G 3/3233* (2016.01)

(52) U.S. Cl.
CPC ... *G09G 3/3607* (2013.01); *G09G 2300/0819* (2013.01); *G09G 2320/043* (2013.01)

(58) Field of Classification Search
CPC .......... G09G 2320/043; H04N 13/122; H04N 13/111
See application file for complete search history.

(56) References Cited

FOREIGN PATENT DOCUMENTS

| | | | | |
|---|---|---|---|---|
| CN | 102307312 | A | | 1/2012 |
| CN | 102768761 | A | * | 11/2012 |
| CN | 102768761 | A | | 11/2012 |
| CN | 103236082 | A | * | 8/2013 |
| CN | 103236082 | A | | 8/2013 |
| CN | 103248911 | A | | 8/2013 |
| CN | 104780355 | A | * | 7/2015 |
| CN | 104780355 | A | | 7/2015 |
| CN | 104837000 | A | | 8/2015 |
| CN | 106060512 | A | | 10/2016 |
| CN | 107147894 | A | | 9/2017 |

* cited by examiner

Sequentially performing a step of mapping, determining and marking row by row, comprising mapping two first pixel points adjacent to each other in a row direction among a plurality of first pixels in a reference camera image to two second pixels in a virtual camera image, and determining whether there is a hole with a gray scale of zero between the two mapped second pixels, and if so, marking the hole ~ 101

Sequentially performing a step of scanning, assessing and filling row by row, comprising scanning two second pixels adjacent to each other in a row direction, assessing whether there is a marked hole between the two adjacent second pixels, and replacing the marked hole according to at least one non-zero second pixel adjacent to the marked hole ~ 102

FIG. 4

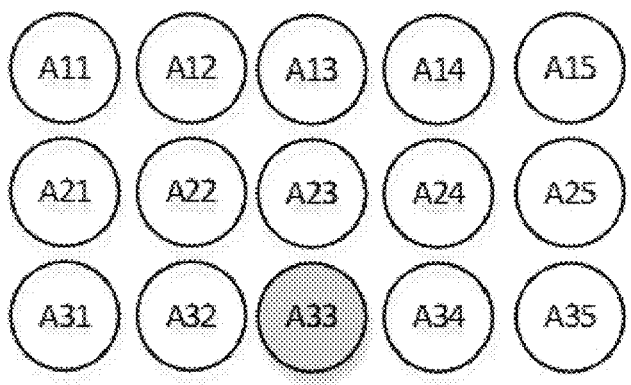

FIG. 5

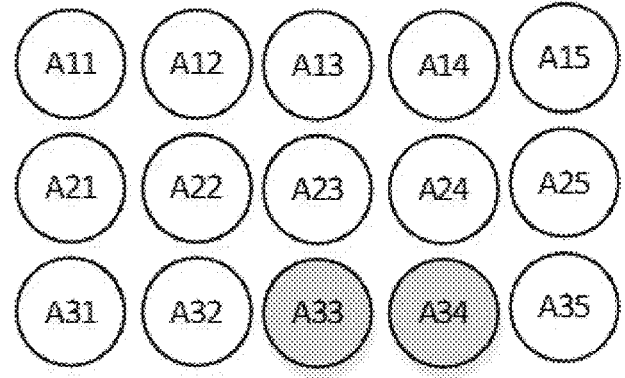

FIG. 6

METHOD AND APPARATUS FOR FILLING HOLES IN NAKED-EYE 3D MULTI-VIEWPOINT IMAGE, AND ELECTRONIC DEVICE FOR PERFORMING THE METHOD

CROSS-REFERENCE TO RELATED APPLICATION

The present application claims the priority to Chinese Patent Application No. 201810717779.7 filed on Jul. 3, 2018, entitled "Method and Apparatus for Filling Holes in Naked-eye 3D Multi-viewpoint Image, and Electronic Device for Performing the Method", the disclosure of which is incorporated herein by reference in its entirety.

TECHNICAL FIELD

The present disclosure relates to the field of naked-eye 3D multi-viewpoint display technology, and in particular, to a method and an apparatus for filling holes in a naked-eye 3D multi-viewpoint image, and an electronic device for performing the method.

BACKGROUND

With the development of display technology, 3D display technology has been widely applied. A basic principle of 3D display technology is to enable viewers to produce a stereoscopic viewing effect through parallax. In a process of watching a stereoscopic TV, the viewers merge video images with parallax, which are simultaneously observed by their left and right eyes, in their brains to produce a stereoscopic image with depth effect.

Naked-eye 3D display technology obviates the need for the viewers to wear any equipment and will be a main display method in the future. In view of the problems that the naked-eye 3D display technology has few viewpoints and the viewpoints are discontinuous, naked-eye 3D multi-viewpoint technology has been developed, which uses prisms to produce multi-viewpoint images so as to enable the viewers to see stereoscopic images at different locations. However, there is a problem caused by multi-viewpoint image acquisition in this technology, for example, in a case of shooting with cameras, an 8-viewpoint 3D image needs 8 cameras for shooting, an increase in the number of the cameras leads to an increase in shooting cost, and further causes a problem of calibration of different cameras. Depth image based rendering technology in the known art can solve the problem of naked-eye 3D data acquisition, but virtual camera images obtained by 3D transformation of original reference camera images in this technology is very likely to generate image holes, which will affect display quality and viewing effect of the images.

SUMMARY

In view of the above problem, the present disclosure provides a method and an apparatus for filling holes in a naked-eye 3D multi-viewpoint image, and an electronic device for performing the method, which may fill image holes generated when image transformation.

The present disclosure provides a method for filling holes in a naked-eye 3D multi-viewpoint image, including:

sequentially performing a step of mapping, determining and marking row by row, the step of mapping, determining and marking comprises mapping two first pixels adjacent to each other in a row direction among a plurality of first pixels in a reference camera image to two second pixels in a virtual camera image, determining whether there is a hole with a gray scale of zero between the two mapped second pixels, and if so, marking the hole; and sequentially performing a step of scanning, assessing and filling row by row, the step of scanning, assessing and filling comprises scanning two second pixels adjacent to each other in a row direction, assessing whether there is a marked hole between the two adjacent second pixels, and replacing the marked hole according to at least one non-zero second pixel adjacent to the marked hole.

Optionally, the step of determining whether there is a hole with a gray scale of zero between the two mapped second pixels includes:

obtaining a difference between horizontal coordinates of the two second pixels, determining whether the difference is greater than a difference between horizontal coordinates of two adjacent mapped second pixels without a hole between the two adjacent mapped second pixels, and if so, determining that there is a hole with a gray scale of zero between the two second pixels.

Optionally, the step of marking the hole comprises marking the hole with a fixed pixel value.

Optionally, the step of assessing whether there is a marked hole between the two adjacent second pixels further includes assessing whether the marked hole includes at least three consecutive vacant pixels.

Optionally, the step of assessing whether the marked hole includes at least three consecutive vacant pixels comprises detecting a pixel value of each of the two adjacent second pixels and vacant pixels between the two adjacent second pixels to assess whether the marked hole includes at least three consecutive vacant pixels.

Optionally, if the marked hole does not include at least three consecutive vacant pixels, the step of replacing the vacant pixel according to at least one non-zero second pixel adjacent to the vacant pixel includes:

acquiring at least one non-zero second pixel from a pixel array centered on the vacant pixel, calculating a gray gradient of the at least one non-zero second pixel in a direction directing from the vacant pixel to the at least one non-zero second pixel respectively, and replacing the vacant pixel with the non-zero second pixel in the direction in which the gray gradient is minimum.

Optionally, if the marked hole includes at least three consecutive vacant pixels and the virtual camera image is shifted to the right relative to the reference camera image, sequentially processing a step on the vacant pixels from left to right as follows:

acquiring at least one non-zero second pixel from a pixel array centered on the vacant pixel, calculating a gray gradient of the at least one non-zero second pixel in a direction directing from the vacant pixel to the at least one non-zero second pixel respectively, and replacing the vacant pixel with the non-zero second pixel in the direction in which the gray gradient is minimum.

Optionally, if the marked hole includes at least three consecutive vacant pixels and the virtual camera image is shifted to the left relative to the reference camera image, sequentially processing a step on the vacant pixels from right to left as follows:

acquiring at least one non-zero second pixel from a pixel array centered on the vacant pixel, calculating a gray gradient of the at least one non-zero second pixel in a direction directing from the vacant pixel to the at least one non-zero second pixel, and replacing the vacant pixel with the non-zero second pixel in the direction in which the gray gradient is minimum.

Optionally, the step of acquiring at least one non-zero second pixel from a pixel array centered on the vacant pixel includes acquiring four non-zero pixels in different directions of neighborhoods of the vacant pixel from a pixel array centered on the vacant pixel.

The embodiments of the present disclosure further provide an apparatus for filling holes in a naked-eye 3D multi-viewpoint image, including:

a mapping circuit which is configured to sequentially map two first pixels adjacent to each other in a row direction in a reference camera image to two second pixels in a virtual camera image row by row;

a judging and marking circuit which is configured to sequentially determine whether there is a hole with a gray scale of zero between the two mapped second pixels, and if so, mark the hole row by row;

a scanning and assessing circuit which is configured to sequentially scan two adjacent second pixels adjacent to each other in a row direction, assessing whether there is a marked hole between the two adjacent second pixels row by row;

a filling circuit which is configured to replace the marked hole according to at least one non-zero second pixel adjacent to the marked hole;

the mapping circuit, the judging and marking circuit, the scanning and assessing circuit and the filling circuit are sequentially connected.

Optionally, the scanning and assessing circuit is further configured to assess whether the marked hole includes at least three consecutive vacant pixels.

Optionally, the judging and marking circuit is configured to determine whether there is a hole according to a difference between horizontal coordinates of second pixels in the virtual camera image, and mark a hole with a fixed pixel value.

Optionally, if the marked hole does not include at least three consecutive vacant pixels, the filling circuit is configured to replace the vacant pixel according to at least one non-zero second pixel adjacent to the vacant pixel in a following way:

acquiring at least one non-zero second pixel from a pixel array centered on the vacant pixel, calculating a gray gradient of the at least one non-zero second pixel in a direction directing from the vacant pixel to the at least one non-zero second pixel respectively, and replacing the vacant pixel with the non-zero second pixel in the direction in which the gray gradient is minimum.

Optionally, if the marked hole includes at least three consecutive vacant pixels and the virtual camera image is shifted to the right relative to the reference camera image, the filling circuit is configured to sequentially replace the vacant pixels from left to right in a following way:

acquiring at least one non-zero second pixel from a pixel array centered on the vacant pixel, calculating a gray gradient of the at least one non-zero second pixel in a direction directing from the vacant pixel to the at least one non-zero second pixel respectively, and replacing the vacant pixel with the non-zero second pixel in the direction in which the gray gradient is minimum.

Optionally, if the marked hole includes at least three consecutive vacant pixels and the virtual camera image is shifted to the left relative to the reference camera image, the filling circuit is configured to sequentially fill the vacant pixels from right to left in a following way:

acquiring at least one non-zero second pixel from a pixel array centered on the vacant pixel, calculating a gray gradient of the at least one non-zero second pixel in a direction directing from the vacant pixel to the at least one non-zero second pixel respectively, and replacing the vacant pixel with the non-zero second pixel in the direction in which the gray gradient is minimum.

The embodiments of the present disclosure further provide an electronic device, including at least one processor;

a memory communicatively coupled to the at least one processor; wherein the memory stores instructions executable by the at least one processor, the instructions being executed by the at least one processor so that the at least one processor performs the method described above.

BRIEF DESCRIPTION OF THE FIGURES

FIG. 4 is a flowchart illustrating a method for filling holes in a naked-eye 3D multi-viewpoint image according to an embodiment of the present disclosure;

FIG. 5 is a schematic diagram of a single vacant pixel according to an embodiment of the present disclosure;

FIG. 6 is a schematic diagram of two consecutive vacant pixels according to an embodiment of the present disclosure;

DETAILED DESCRIPTION

In order to make the objectives, technical solutions and advantages of the present disclosure clearer, the present disclosure will be further described in detail below with reference to specific embodiments in conjunction with accompanying drawings.

It should be noted that all the expressions using "first" and "second" in the embodiments of the present disclosure are used to distinguish between two different entities or parameters which have the same name, and "first" and "second" are only for the ease of expression, and should not be considered as limitation to the embodiments of the present disclosure. The above explanation also applies to subsequent embodiments and will not be repeated.

Figure 1:
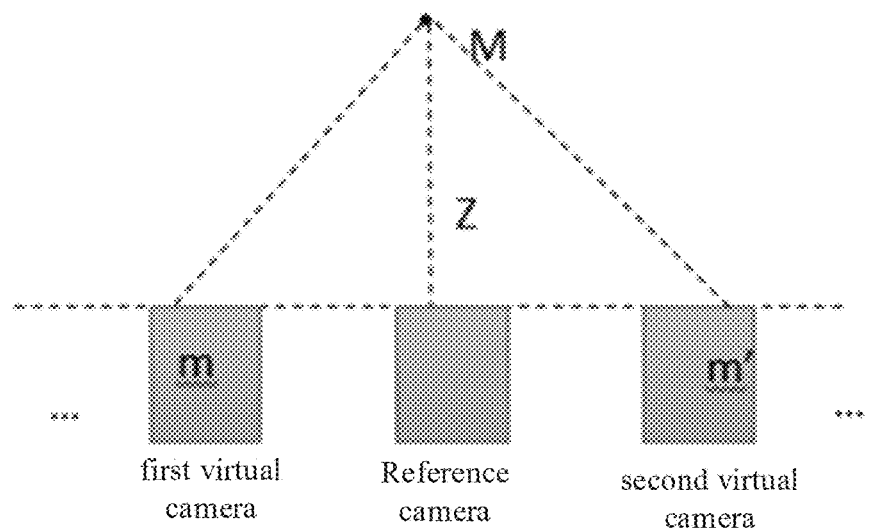
FIG. 1 is a schematic diagram illustrating a mapping relationship between a reference camera image and a virtual camera image.
Figure 2:
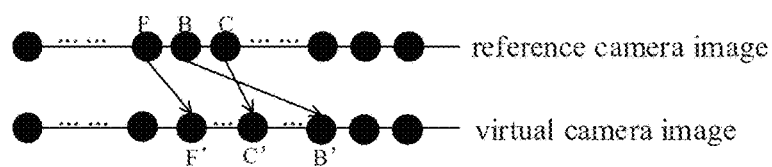
FIG. 2 is a schematic diagram illustrating a principle of hole generation.

FIG. 1 is a schematic diagram illustrating a mapping relationship between a reference camera image and a virtual camera image; and FIG. 2 is a schematic diagram illustrating a principle of hole generation.

Referring to FIG. 1, a reference camera is a camera that captures images in a real scene, and a plurality of virtual camera images corresponding to a first virtual camera, a second virtual camera and so on are obtained by performing three-dimensional (3D) image transformation on reference camera images captured by the reference camera. The 3D image transformation process is as follows: shifting pixels of a reference camera image in a horizontal direction, and keeping positions of the pixels in a vertical direction unchanged, so as to obtain a virtual camera image. The 3D image transformation process may be performed based on calculation with an axis-shift algorithm, and a transformation formula is:

$$\begin{cases} u^* = u + \alpha_u t_x \left( \frac{1}{Z} - \frac{1}{Z_C} \right) \\ v^* = v \end{cases}$$

where (u*, v*) represents coordinates of pixels in the virtual camera image, (u, v) represents coordinates of the pixels in the reference camera image, $a_u$ represents camera parameters, and $t_x$ represents a physical distance between the virtual camera and the reference camera, Z represents a depth value of a captured pixel, and Zc represents a depth value of a zero parallax plane, and may be adjusted according to habits of viewers.

In the above 3D image transformation process, adjacent pixels in the reference camera image may not be on adjacent positions after being mapped to the virtual camera image in a process of obtaining the virtual camera image, that is, visible objects in the reference camera image may distort while being mapped to the virtual camera image, which results in expansion or other deformation of the image. Referring to FIG. 2, F and B are two adjacent pixels in the reference camera image, F is mapped to F' and B is mapped to B' after being mapped to the virtual camera image, and a hole is generated if there is no pixel mapped between F' and B'.

Figure 3:
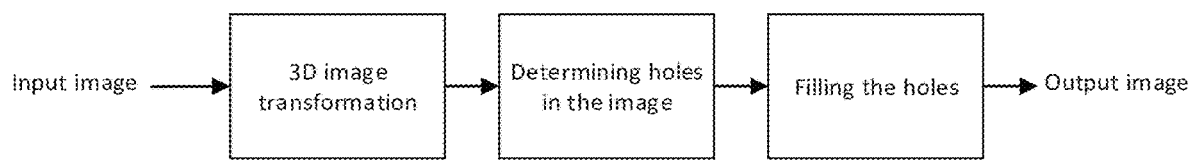
FIG. 3 is a schematic diagram illustrating a method for filling holes in a naked-eye 3D multi-viewpoint image according to an embodiment of the present disclosure.

In order to solve the above problem, an embodiment of the present disclosure provides a method for filling holes in a naked-eye 3D multi-viewpoint image. FIG. 3 is a schematic diagram illustrating a method for filling holes in a naked-eye 3D multi-viewpoint image according to an embodiment of the present disclosure, and FIG. 4 is a flowchart illustrating a method for filling holes in a naked-eye 3D multi-viewpoint image according to an embodiment of the present disclosure. The method for filling holes in a naked-eye 3D multi-viewpoint image includes:

Step 101: sequentially performing a step of mapping, determining and marking row by row, the step of mapping, determining and marking comprises mapping two first pixels adjacent to each other in a row direction among a plurality of first pixels in a reference camera image to two second pixels in a virtual camera image, and determining whether there is a hole with a gray scale of zero between the two mapped second pixels, and if so, marking the hole.

Step 102: sequentially performing a step of scanning, assessing and filling row by row, the step of scanning, assessing and filling comprises scanning two second pixels adjacent to each other in a row direction, assessing whether there is a marked hole between the two adjacent second pixels, and replacing the hole according to at least one non-zero second pixel adjacent to the marked hole.

In the above embodiment, the reference camera image is transformed as an input image with the axis-shift algorithm to obtain the virtual camera image, the holes generated in the virtual camera image and positions thereof are detected with the method described in Step 101, then the vacant pixels are filled with the method described in Step 102, and finally an output image is obtained. The method described in the above embodiment facilitates improving display quality of naked-eye 3D image, and brings consumers more comfortable naked-eye 3D display experiences.

In some other embodiments of the present disclosure, the step of determining whether there is a hole with a grayscale of zero between the two mapped second pixels comprises: obtaining a difference between horizontal coordinates of the two second pixels, and determining whether the difference is greater than 1 (a difference between two adjacent second pixels without a hole between the two adjacent second pixels is 1), and if so, determining that there is a hole between the two second pixels. Referring to FIG. 2, provided pixel F is mapped to pixel F' with a horizontal coordinate $X_f$ and pixel B is mapped to pixel B' with a horizontal coordinate $X_b$ in the virtual camera image, if $|X_b-X_f|>1$, there is a hole between pixels F' and B'. Or, provided pixels B and C in the reference camera image are mapped to pixels B' and C' with a horizontal coordinate Xc in the virtual camera image, if $|X_C-X_b|>1$, there is a hole between pixels B' and C'.

It should be noted that, in the mapping and determining phase of Step 101, the difference between the horizontal coordinates of the two second pixels may be used to determine not only existence of a hole but also a size of the hole (i.e., a number of vacant pixels included in the hole). However, the coordinates of the vacant pixels acquired at this time will change with subsequent mapping. As shown in FIG. 2, when the adjacent pixels B and C in the reference camera image are mapped into the virtual camera image, their relative position relationship is changed. Due to a large number of pixels in the image, the holes in the virtual camera image may be continuously occupied by pixels mapped subsequently in the process of mapping the pixels in pairs. Therefore, all the pixels adjacent to each other in the reference camera image are subject to the mapping, determining and marking process according to Step 101 so as to obtain accurate positions of holes.

In the above embodiment, when the first pixel in the reference camera image is mapped to the second pixel in the virtual camera image, only the horizontal coordinate changes, so that it is possible to determine whether there is a hole between the two second pixels only by comparing the horizontal coordinates. If the two mapped second pixels are still adjacent to each other, the difference between their horizontal coordinates is equal to 1. If there is a hole between the two mapped second pixels, the difference between their horizontal coordinates will be greater than 1. Therefore, it may be determined whether there is a hole between the two second pixels according to the difference between the horizontal coordinates of the two second pixels.

As some embodiments of the present disclosure, the step of marking the hole includes marking the hole with a fixed pixel value. When mapping the first pixels in the reference camera image to the second pixels in the virtual camera image, if it is determined that there is a hole between the two second pixels in a mapping relationship with any two adjacent first pixels in the row direction, the vacant pixels between the two second pixels are directly marked with a fixed pixel value $(R_1, G_1, B_1)$ in the mapping process. There is no special requirement for the fixed pixel value used for marking, for example, both such as (255, 0, 0) or and (255, 255, 0) are applicable. As shown in FIG. 2, pixels F, B, and C in the reference camera image are respectively mapped to pixels F', B', and C' in the virtual camera image, it is first determined whether there is a hole between pixels and B', if so, the vacant pixel with a gray scale of zero between pixels F' and B' is marked, and then it is determined whether there is a hole between pixels B' and C', and if so, the hole is marked. Even though a position of pixel C' is marked before mapping pixel C, the mapped pixel C' will cover the color used for marking, which prevents misjudgment when determining whether there are three consecutive vacant pixels in a following step.

Optionally, after all the holes of the virtual camera image are marked, perform Step 102: sequentially scanning two second pixels adjacent to each other in a row direction, assessing whether there is a marked hole between the two adjacent second pixels row by row. After finishing marking every hole, each coordinate position in the virtual camera image is detected to determine whether a pixel value of the coordinate position is $(R_1, G_1, B_1)$, and if so, it is determined that the coordinate position is a vacant pixel. In the above embodiment, the holes are successfully marked by being filled with a fixed pixel value, and then the coordinates of the holes are obtained by detecting whether a pixel value of each of the coordinate positions is the same as that of the fixed pixel value used for filling, thereby facilitating subsequent filling of the holes.

The process of scanning and assessing step also may assess a size of the marked hole, i.e., whether the marked hole includes at least three consecutive vacant pixels, so that different methods may be selected for filling the holes. After all the holes are marked, pixel values of all the coordinate positions are detected. When the pixel value of a coordinate position is the same as the pixel value of the fixed pixel value used for marking, the coordinates of the hole are obtained, so as to determine whether the hole includes at least three consecutive vacant pixels. Taking three adjacent coordinate positions A11, A12, and A13 as an example, a method of assessing whether there are at least three consecutive vacant pixels by comparing the pixel values of the three coordinate positions is as follows: provided A11 is a vacant pixel, if A11≠A12, A12 is not a vacant pixel, so that there are no at least three consecutive vacant pixels and there is only one vacant pixel; if A11=A12 and A12≠A13, both A11 and A12 are vacant pixels, but A13 is not a vacant pixel, so that there are no at least three consecutive vacant pixels and there are two consecutive vacant pixels; and if A11=A12 and A12=A13, A11, A12, A13 are all vacant pixels, so that there are at least three consecutive vacant pixels.

In some embodiments, if there are no at least three consecutive vacant pixels, the step of filling the vacant pixel according to at least one non-zero second pixel adjacent to the vacant pixel includes: acquiring at least one non-zero second pixel from a pixel array centered on the vacant pixel, calculating a gray gradient of the at least one non-zero second pixel in a direction directing from the vacant pixel to the at least one non-zero second pixel, and selecting the non-zero second pixel whose direction is corresponding to a minimum gray gradient for filling the vacant pixel. In this embodiment, if there are no at least three consecutive vacant pixels in each row, that is, there is only a single vacant pixel or two consecutive vacant pixels, each of the vacant pixels can be directly filled through the above method. If there are two consecutive vacant pixels, the two vacant pixels are sequentially filled.

As a specific embodiment, it is assumed that the vacant pixels are filled one by one in an order from top to bottom and from left to right. Referring to FIG. 5, if A33 is detected as a vacant pixel, pixels A32, A22, A23, and A24 around A33 that are not vacant are selected, and gray gradients of the pixels A32, A22, A23, and A24 in directions directing from the vacant pixel A33 to pixels A32, A22, A23, and A24 are calculated respectively, with a formula as follows:

$$\begin{cases} \partial 1 = |A31 - A32| \\ \partial 2 = |A11 - A22| \\ \partial 3 = |A13 - A23| \\ \partial 4 = |A15 - A24| \end{cases}$$

Where ∂1, ∂2, ∂3 and ∂4 represent the gray gradients of pixels A32, A22, A23, and A24 in a direction directing from the vacant pixel A33 to the second pixels A32, A22, A23, and A24 respectively, and A31 and A32 in the mathematic expression|A31−A32| represent grey values of the corresponding second pixels. A minimum gray gradient is obtained by comparing ∂1, ∂2, ∂3 and ∂4. If ∂1 is the minimum gray gradient, A32 is used to fill A33. In this embodiment, use of the second pixel with the minimum gray gradient may ensure that a color of the vacant pixel is closer to colors of the surrounding pixels after the vacant pixel is filled, and it is unlikely to generate artifacts.

Referring to FIG. 6, if both A33 and A34 are vacant pixels, A33 is filled first and then A34 is filled with the method described in the above embodiment. In this embodiment, the vacant pixels are filled one by one in the order from top to bottom and from left to right, so A33 is filled first and then A34 is filled, thereby ensuring that the four second pixels being involved in gray gradient calculation are definitely not vacant pixels.

Figure 7:
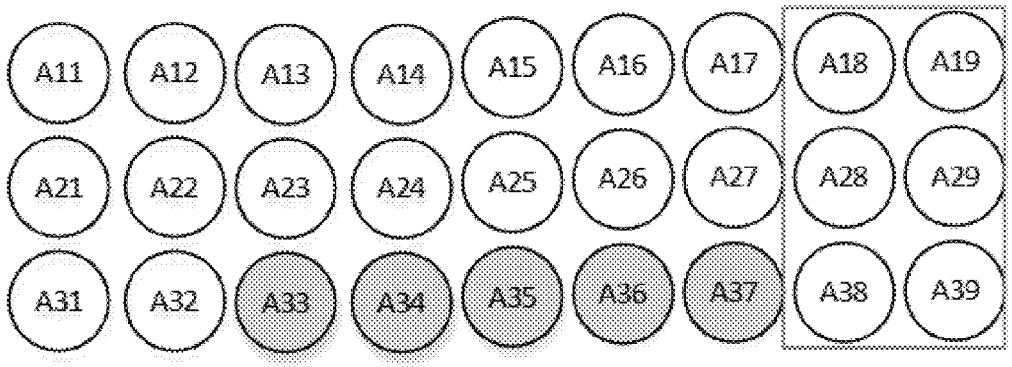
FIG. 7 is a schematic diagram of vacant pixels in an image shifted to the right according to an embodiment of the present disclosure.

In an optional embodiment, if there are at least three consecutive vacant pixels and the virtual camera image is shifted to the right relative to the reference camera image, the vacant pixels are sequentially processed from left to right as follows: acquiring at least one non-zero second pixel from a pixel array centered on the vacant pixel, calculating a gray gradient of the at least one non-zero second pixel in a direction directing from the vacant pixel to the at least one non-zero second pixel, and selecting the non-zero second pixel whose direction is corresponding to a minimum gray gradient for filling the vacant pixel. Referring to FIG. 7, A33-A37 are vacant pixels. If there is no hole between the second pixels mapped in the virtual camera image, A38 should be located at a position of A33. However, the virtual camera image is shifted to the right relative to the reference camera image due to existing holes. In order to ensure perfect fusion of a plurality of holes with surrounding pixels, vacant pixels A33-A37 are required to be sequentially filled from left to right.

Figure 8:
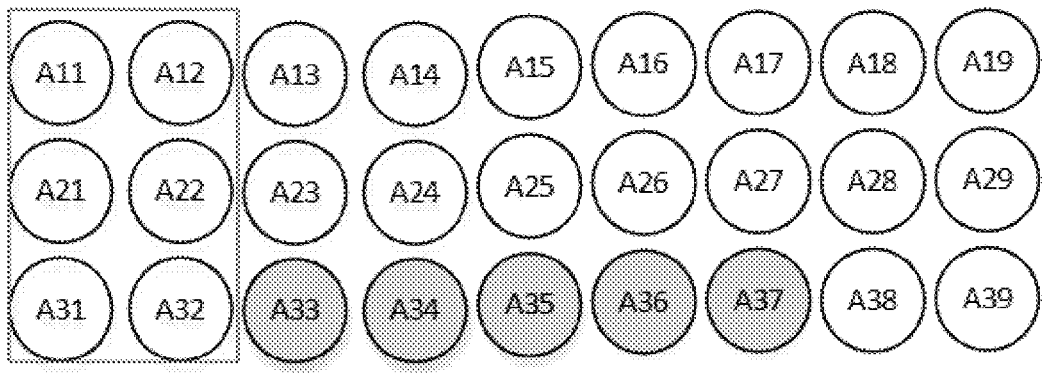
FIG. 8 is a schematic diagram of vacant pixels in an image shifted to the left according to an embodiment of the present disclosure.

In another optional embodiment, if there are at least three consecutive vacant pixels and the virtual camera image is shifted to the left relative to the reference camera image, the vacant pixels are sequentially processed from right to left as follows: acquiring at least one non-zero second pixel from a pixel array centered on the vacant pixel, calculating a gray gradient of the at least one not-zero second pixel in a direction from the vacant pixel to the at least one non-zero second pixel, and selecting the non-zero second pixel whose direction is corresponding to a minimum gray gradient for filling the vacant pixel. Referring to FIG. 8, A33-A37 are vacant pixels. If there is no hole between the second pixels mapped in the virtual camera image, pixel A32 should be located at a position of A37. However, the virtual camera image is shifted to the left relative to the reference camera image due to existing holes, which requires sequentially filling A37-A33 from right to left, with a specific method as follows: firstly, gray gradients of the four second pixels A38, A28, A27 and A26 in a direction directing from the vacant pixel A37 to the four surrounding second pixels A38, A28, A27 and A26 are calculated with a formula as follows:

$$\begin{cases} \beta 1 = |A38 - A39| \\ \beta 2 = |A19 - A28| \\ \beta 3 = |A17 - A27| \\ \beta 4 = |A15 - A26| \end{cases}$$

where β1, β2, β3 and β4 represent the gray gradients of the pixels A38, A28, A27 and A26 in a direction directing from the vacant pixel A37 to pixels A38, A28, A27 and A26 respectively. A minimum gray gradient is obtained by comparing β1, β2, β3 and β4. If β1 is the minimum gray gradient, pixel A38 is used to replace vacant pixel A37, and then vacant pixels A36, A35, A34 and A33 are filled in turn.

Optionally, the step of acquiring at least one non-zero second pixel from a pixel array centered on the vacant pixel comprises: acquiring four non-zero pixels in different directions of neighborhoods of the vacant pixel in the 3*3 pixel array, that is, selecting four non-zero pixels in different directions of neighborhoods from eight pixels in the neighborhoods of the vacant pixel.

In the above embodiment, when a number of the vacant pixels is less than three, since a range of the vacant pixels is small, it is unnecessary to consider a direction of image offset, and it only needs to use the pixel, which is adjacent to the vacant pixel and is corresponding to the minimum gray gradient, to fill the vacant pixel. When there are three or more consecutive vacant pixels, since the second pixels expand widely during mapping, it is necessary to select an appropriate pixel for filling the vacant pixels according to the direction of image offset. In such a way, image quality of the virtual camera image and user experience of naked-eye 3D display may be improved to the greatest extent.

Figure 9:
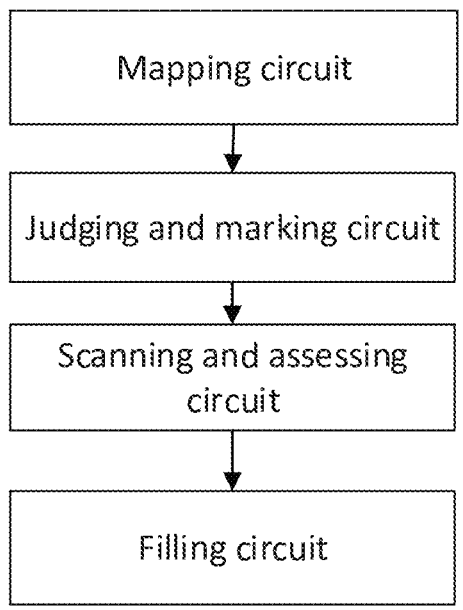
FIG. 9 is a schematic structural diagram of an apparatus for filling holes in a naked-eye 3D multi-viewpoint image according to an embodiment of the present disclosure.

Another aspect of the present disclosure provides an apparatus for filling holes in a naked-eye 3D multi-viewpoint image. Referring to FIG. 9, the apparatus comprises:

a mapping circuit 11, configured to sequentially map first pixels adjacent to each other in a row direction in a reference camera image to second pixels in a virtual camera image row by row;

a judging and marking circuit 12, configured to sequentially determine whether there is a hole with a gray scale of zero between the two mapped second pixels, and if so, mark the hole row by row;

a scanning and assessing circuit 13, configured to sequentially scan two second pixels adjacent to each other in a row direction, and assess whether there is a marked hole between the two adjacent second pixels row by row; and a filling circuit 14, configured to replace the marked hole according to at least one non-zero second pixel adjacent to the marked hole.

The mapping circuit 11, the judging and marking circuit 12, the scanning and assessing circuit 13 and the filling circuit 14 are sequentially connected.

Optionally, the scanning and assessing circuit 13 is further configured to assess whether the marked hole includes at least three consecutive vacant pixels.

Optionally, the judging and marking circuit 12 is configured to determine whether a difference between horizontal coordinates of the two mapped second pixels is greater than 1, and if so, determine that there is a hole between the two second pixels; and the judging and marking circuit 12 is further configured to mark the hole with a fixed pixel value.

Optionally, the filling circuit 14 is further configured to acquire four non-zero pixels in different directions of neighborhoods of the vacant pixel from a pixel array containing the vacant pixel. Optionally, the filling circuit 14 is further configured to: if the marked hole does not include at least three consecutive vacant pixels, acquire at least one non-zero second pixel from a pixel array centered on the vacant pixel, calculate a gray gradient of the at least one non-zero second pixel in a direction directing from the vacant pixel to the at least one non-zero second pixel, and select the non-zero second pixel in the direction in which the gray gradient is minimum for replacing the vacant pixel.

Optionally, the filling circuit 14 is further configured to: if the marked hole includes at least three consecutive vacant pixels and the virtual camera image is shifted to the right relative to the reference camera image, sequentially process the vacant pixels from left to right as follows: acquiring at least one non-zero second pixel from a pixel array centered on the vacant pixel, calculating a gray gradient of the at least one non-zero second pixel in a direction directing from the vacant pixel to the at least one non-zero second pixel, and selecting the non-zero second pixel in the direction in which the gray gradient is minimum for replacing the vacant pixel.

Optionally, the filling circuit 14 is further configured to: if the marked hole includes at least three consecutive vacant pixels and the virtual camera image is shifted to the left relative to the reference camera image, sequentially process the vacant pixels from right to left as follows: acquiring at least one non-zero second pixel from a pixel array centered on the vacant pixel, calculating a gray gradient of the at least one non-zero second pixel in a direction directing from the vacant pixel to the at least one non-zero second pixel, and selecting the non-zero second pixel in the direction in which the gray gradient is minimum for replacing the vacant pixel.

In the apparatus for filling holes in a naked-eye 3D multi-viewpoint image according to the present disclosure, the mapping circuit, the judging and marking circuit, the scanning and assessing circuit and the filling circuit may be implemented by executing a computer program/instruction by a processor, or by hardware capable of executing the computer program/instruction, or by a combination thereof.

Figure 10:
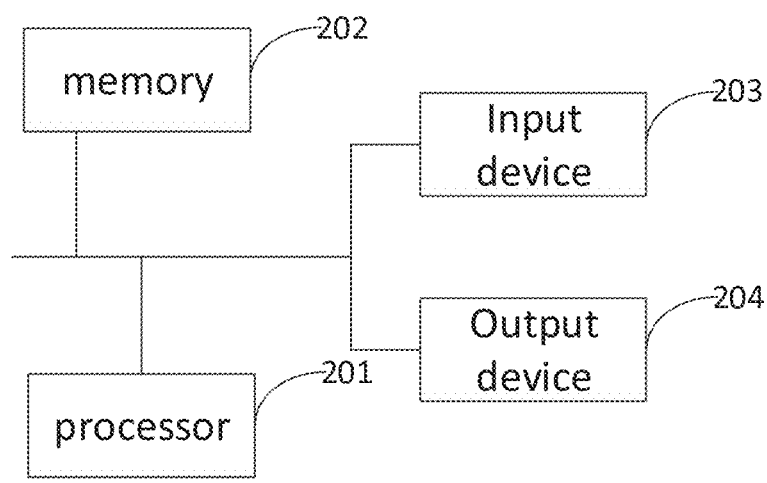
FIG. 10 is a schematic structural diagram of an electronic device according to an embodiment of the present disclosure.

According to another aspect of the embodiments of the present disclosure, an electronic device for performing a method for filling holes in a naked eye 3D multi-viewpoint image is provided. Referring to FIG. 10, the electronic device includes:

at least one processor 201 and a memory 202, and one processor 201 is taken as an example in FIG. 10.

The electronic device for performing a method for filling holes in a naked-eye 3D multi-viewpoint image may further include an input device 203 and an output device 204.

The processor 201, the memory 202, the input device 203, and the output device 204 may be connected by means of bus connection or by other means. FIG. 10 shows an example of bus connection.

The memory 202 is a non-volatile computer readable storage medium, and may be used for storing non-volatile software programs, non-volatile computer-executable programs and circuits, such as program instruction/circuits corresponding to the method for filling holes in a naked-eye 3D multi-viewpoint image in the embodiments of the present application. The processor 201 operates various functional applications and data processing of the server by executing non-volatile software programs, instructions and circuits stored in the memory 202, that is, to implement the method for filling holes in a naked-eye 3D multi-viewpoint image in the above method embodiments.

The memory 202 may include a program storage area and a data storage area, wherein the program storage area may store an operating system, and application programs required for by at least one function; and the data storage area may store data created for using the apparatus for filling holes in a naked-eye 3D multi-viewpoint image. Moreover, the memory 202 may include a high speed random access memory, and may also include a non-volatile memory, for example, at least one magnetic storage device, flash memory device, or other non-volatile solid state storage device. In some embodiments, the memory 202 may include a memory remotely located relative to the processor 201, which may be connected to the apparatus for filling holes in a naked-eye 3D multi-viewpoint image via a network. Examples of such a network include, but are not limited to, the Internet, intranets, local area networks, mobile communication networks, and combinations thereof.

The input device 203 may receive input numeric or character information, and generate keyboard signal input related to user settings and function control of the apparatus for filling holes in a naked-eye 3D multi-viewpoint image. The output device 204 may include a display device such as a display screen.

The one or more circuits are stored in the memory 202, and perform the method for filling holes in a naked-eye 3D multi-viewpoint image in any of the above method embodiments when being executed by the one or more processors 201.

It should be understood by those of ordinary skill in the art that the discussion of any of the above embodiments is merely exemplary and is not intended to suggest that the scope of the present disclosure (including the claims) is limited to the embodiments; within the idea of the present disclosure, the above embodiments or the technical features in the different embodiments may be combined with each other, the steps may be carried out in any order, and there are many other variations in various aspects of the present disclosure as described above, which are not provided in detail for the sake of brevity.

In addition, well-known power/ground connections to integrated circuit (IC) chips and other components may or may not be shown in the provided drawings, in order to simplify illustration and discussion and make the present disclosure easy to be understood. Furthermore, the apparatus may be shown in block diagrams in order to avoid obscuring the present disclosure, which also contemplates the fact that the details of the embodiments of the apparatus shown in the block diagrams are highly dependent on the platform on which the present disclosure is to be implemented (i.e., these details should be fully understood by one skilled in the art). In the case that specific details (e.g., circuits) are described to present the exemplary embodiments of the present disclosure, it will be apparent to one skilled in the art that the present disclosure may be implemented without these specific details or with these specific details being changed. Accordingly, the description should be considered as illustrative rather than restrictive.

Although the present disclosure has been described in conjunction with the specific embodiments, many alternatives, modifications and variations of these embodiments will be apparent to one skilled in the art. For example, other memory architectures (e.g., dynamic RAM (DRAM)) may be used in the embodiments discussed above.

All such alternatives, modifications and variations are intended to be included within the scope of the appended claims. Therefore, any omissions, modifications, equivalents and improvements, which are made within the spirit and scope of the present disclosure, are intended to be included within the scope of the present disclosure.

What is claimed is:

1. A method for filling holes in a naked-eye 3D multi-viewpoint image, comprising:

sequentially performing a step of mapping, determining and marking row by row, the step of mapping, determining and marking comprises mapping two first pixels adjacent to each other in a row direction among a plurality of first pixels in a reference camera image to two second pixels in a virtual camera image, and determining whether there is a hole with a gray scale of zero between the two mapped second pixels, and if so, marking the hole; and sequentially performing a step of scanning, assessing and filling row by row, the step of scanning, assessing and filling comprises scanning two second pixels adjacent to each other in a row direction, assessing whether there is a marked hole between the two adjacent second pixels, and replacing the marked hole according to at least one non-zero second pixel adjacent to the marked hole, wherein the step of replacing the marked hole according to at least one non-zero second pixel adjacent to the marked hole comprises:

if the marked hole does not include at least three consecutive vacant pixels, acquiring at least one non-zero second pixel from a pixel array centered on the vacant pixel, calculating a gray gradient of the at least one non-zero second pixel in a direction directing from the vacant pixel to the at least one non-zero second pixel respectively, and replacing the vacant pixel with the non-zero second pixel in the direction in which the gray gradient is minimum;

if the marked hole includes at least three consecutive vacant pixels and the virtual camera image is shifted to the right relative to the reference camera image, sequentially for the vacant pixels from left to right, acquiring at least one non-zero second pixel from a pixel array centered on the vacant pixel, calculating a gray gradient of the at least one non-zero second pixel in a direction directing from the vacant pixel to the at least one non-zero second pixel respectively, and replacing the vacant pixel with the non-zero second pixel in the direction in which the gradient is minimum, if the marked hole includes at least three consecutive vacant pixels and the virtual camera image is shifted to the left relative to the reference camera image, sequentially for the vacant pixels from right to left, acquiring at least one non-zero second pixel from a pixel array centered on the vacant pixel, calculating a gray gradient of the at least one non-zero second pixel in a direction directing from the vacant pixel to the at least one non-zero second pixel respectively, and replacing the vacant pixel with the non-zero second pixel in the direction in which the gradient is minimum.

2. The method for filling holes in a naked-eye 3D multi-viewpoint image of claim 1, wherein the step of determining whether there is a hole with a gray scale of zero between the two mapped second pixels comprises:

obtaining a difference between horizontal coordinates of the two second pixels, determining whether the difference is greater than a difference between horizontal coordinates of two adjacent mapped second pixels without a hole between the two adjacent mapped second pixels, and if so, determining that there is a hole between the two mapped second pixels.

3. The method for filling holes in a naked-eye 3D multi-viewpoint image of claim 2, wherein the step of marking the hole comprises marking the hole with a fixed pixel value.

4. The method for filling holes in a naked-eye 3D multi-viewpoint image of claim 3, the step of assessing whether there is a marked hole between the two adjacent second pixels, further comprises assessing whether the marked hole includes at least three consecutive vacant pixels.

5. The method for filling holes in a naked-eye 3D multi-viewpoint image of claim 4, wherein the step of assessing whether the marked hole includes at least three consecutive vacant pixels comprises detecting a pixel value of each of the two adjacent second pixels and vacant pixels between the two adjacent second pixels to assess whether the marked hole includes at least three consecutive vacant pixels.

6. The method for filling holes in a naked-eye 3D multi-viewpoint image of claim 1, wherein the step of acquiring at least one non-zero second pixel from a pixel array centered on the vacant pixel comprises acquiring four non-zero pixels in different directions of neighborhoods of the vacant pixel from a pixel array centered on the vacant pixel.

7. An electronic device, comprising at least one processor; and
a memory communicatively coupled to the at least one processor; wherein
the memory stores instructions executable by the at least one processor, the instructions being executed by the at least one processor so that the at least one processor performs the method of claim 1.

8. An apparatus for filling holes in a naked-eye 3D multi-viewpoint image, comprising:
a mapping circuit which is configured to sequentially map two first pixels adjacent to each other in a row direction in a reference camera image to two second pixels in a virtual camera image row by row;
a judging and marking circuit which is configured to sequentially determine whether there is a hole with a gray scale of zero between the two mapped second pixels, and if so, mark the hole row by row;
a scanning and assessing circuit which is configured to sequentially scan two adjacent second pixels adjacent to each other in a row direction, assessing whether there is a marked hole between the two adjacent second pixels row by row;
a filling circuit which is configured to replace the marked hole according to at least one non-zero second pixel adjacent to the marked hole; wherein
the mapping circuit, the judging and marking circuit, the scanning and assessing circuit and the filling circuit are sequentially connected,
wherein, if the marked hole does not include at least three consecutive vacant pixels, the filling circuit is configured to acquire at least one non-zero second pixel from a pixel array centered on the vacant pixel, calculate a gray gradient of the at least one non-zero second pixel in a direction directing from the vacant pixel to the at least one non-zero second pixel respectively, and replace the vacant pixel with the non-zero second pixel in the direction in which the gray gradient is minimum,
if the marked hole includes at least three consecutive vacant pixels and the virtual camera image is shifted to the right relative to the reference camera image, the filling circuit is configured, sequentially for the vacant pixels from left to right, to acquire at least one non-zero second pixel from a pixel array centered on the vacant pixel, calculate a gray gradient of the at least one non-zero second pixel in a direction directing from the vacant pixel to the at least one non-zero second pixel respectively, and replace the vacant pixel with the non-zero second pixel in the direction in which the gradient is minimum,
if the marked hole includes at least three consecutive vacant pixels and the virtual camera image is shifted to the left relative to the reference camera image, the filling circuit is configured, sequentially for the vacant pixels from right to left, acquire at least one non-zero second pixel from a pixel array centered on the vacant pixel, calculate a gray gradient of the at least non-zero second pixel in a direction directing from the vacant pixel to the at least one non-zero second pixel respectively, and replace the vacant pixel with the non-zero second pixel in the direction in which the gradient is minimum.

9. The apparatus for filling holes in a naked-eye 3D multi-viewpoint image of claim 8, the scanning and assessing circuit is further configured to assess whether the marked hole includes at least three consecutive vacant pixels.

10. The apparatus for filling holes in a naked-eye 3D multi-viewpoint image of claim 9, wherein the judging and marking circuit is configured to determine whether there is a hole according to a difference between horizontal coordinates of second pixels in the virtual camera image, and mark a hole with a fixed pixel value.

* * * * *